May 29, 1945. G. H. POHM 2,377,180
CONTROL CIRCUIT
Filed May 6, 1943

INVENTOR.
GEORGE H. POHM
BY Hoodling and Krost
ATTORNEYS.

Patented May 29, 1945

2,377,180

UNITED STATES PATENT OFFICE 2,377,180

CONTROL CIRCUIT

George H. Pohm, Lorain, Ohio, assignor of one-half to Closman P. Stocker and one-half to E. M. Heavens Application May 6, 1943, Serial No. 485,835

13 Claims. (Cl. 175—363)

This invention relates to control circuits and in particular to a circuit for supplying constant-voltage direct current from an alternating current source through rectifiers.

It is an object of this invention to rectify alternating current and to supply a substantially constant rectified voltage to a variable direct-current load.

Another object of this invention is to maintain a substantially constant unidirectional load voltage over a wide variation of load at a load supplied with rectified alternating current.

Another object of this invention is to utilize a direct-current filter choke as a voltage-controlling element in a rectifying arrangement.

Still another object of this invention is to produce a reactive component in the input impedance of a full-wave rectifier, and to control the rectified voltage by controlling this reactive component.

An additional object of this invention is to provide a battery-charger which will maintain the battery voltage substantially constant in spite of load variations and in spite of variations in the voltage of the alternating-current source.

A further object of this invention is to provide from an alternating-current source of variable voltage, a direct-current source of substantially constant voltage.

Another object of this invention is to protect the rectifiers against overloads by automatically limiting the overload current.

Figure 1:
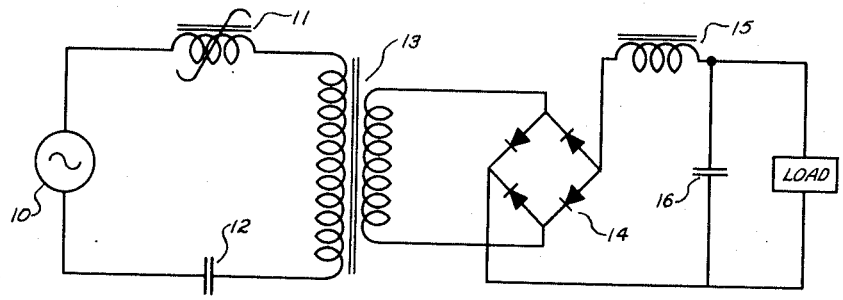
Figure 2:
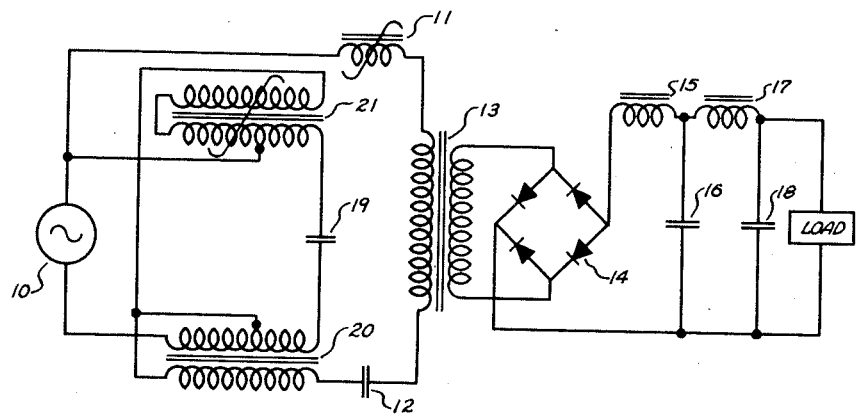

Other objects and a better understanding of my invention may be had by referring to the following specification and claims in connection with the accompanying drawing, in which Figure 1 is the circuit diagram of an embodiment of my invention capable of supplying a substantially constant voltage to a variable load, and Figure 2 is a modification of Figure 1 providing compensation for variations in the voltage of the alternating current source.

In general, when direct current is supplied through rectifiers from an alternating-current source, the direct-current source thus produced has a relatively poor regulation because of the resistance of the transformer, filter chokes, and the rectifiers, particularly when the rectifiers are of the metal-disc or high-vacuum type. For many applications, and particularly for automatic charging of storage batteries, a direct current source of very good regulation is required. By my invention I am able to produce a substantially flat regulation curve or to produce other types of regulation curves when required, and at the same time I am able to protect the rectifiers against overload by automatically limiting overload currents. The manner in which I accomplish these effects can be best understood by referring to Figure 1, which shows diagrammatically a source of alternating current 10 supplying the primary of a transformer 13 through the series impedance of saturable inductance 11 and capacitor 12.

Transformer 13 is shown as an insulating transformer but in those cases where it is not necessary to insulate the load from the alternating-current source 10, an auto-transformer can be used to supply the correct voltage to the rectifiers. The secondary of transformer 13 supplies the input terminals of the full-wave rectifier bridge 13. The output of the rectifier bridge 14 is supplied to the direct current load through filter inductance 15, and the filter condenser 16 is in parallel with the load, by-passing the alternating current passed through inductance 15 around the load. When the load is a battery, it is usually permissible to omit capacitor 16, as the internal resistance of the battery is in general lower than the impedance of capacitor 16. I prefer to construct filter inductance 15 so it has a non-linear characteristic, and changes its impedance as the load current changes but a linear inductance 15 can also be used effectively.

When the current through saturable inductance 11 is small, the inductance has a very high impedance, and the small current flow through it produces considerable voltage drop. As the current increases with increasing load, the reactance of inductance 11 diminishes and, it approaches, and finally reaches the same value as the capacitive reactance of capacitor 12, so that the voltage drop between source 10 and the primary of transformer 13 reaches a minimum value. Thus, the voltage drop diminishes with increasing load current, and the voltage across transformer 13 increases as the load current increases.

In order to take full advantage of the diminishing voltage drop through inductance 11 and capacitor 12 in series, I prefer to use transformer 13 as an inductance substantially in parallel with the input to rectifiers 14. When using transformer 13 as an inductance, I preferably cause it to pass the proper exciting current so that when the load is disconnected from the rectifiers the voltage drop between source 10 and the primary of transformer 13 is approximately its maximum value. Therefore, under light loads, the voltage supplied to the rectifiers is at a minimum, and the load voltage does not rise appreciably as the load current is reduced. When inductance 15 is non-linear, its non-linear characteristic also aids in this action; the high reactance of inductance 15 under light load currents insuring that the load voltage remains substantially at the average value of the alternating voltage supplied to the rectifiers and does not rise toward the crest voltage as occurs when the load is disconnected.

Under heavy load currents, direct current magnetization may reduce the reactance of inducance 15 and produce an alternating current flow in the direct current circuit. This alternating current is chiefly of the second harmonic of the frequency of source 10, and in flowing through inductance 15 consumes inductive volt-amperes which must be supplied from the input side of the rectifiers 14, and the input impedance of the rectifiers 14 becomes inductive under heavy loads. In this manner an inductive reactance can be reflected into the input circuit, the magnitude of the reactance being controlled by the magnitude of the load current.

As previously explained, the voltage drop through the series ferro-resonant combination comprising saturable inductance 11 and capacitor 12 reaches a minimum value when the reactance of inductance 11 becomes approximately equal to the reactance of capacitor 12. A further increase of current through the ferro-resonant combination causes it to become capacitive. The input circuit therefore is responsive to power factor and the inductive reactance reflected by the rectifiers under this condition produces a further voltage rise to the transformer 13. Thus, through the action of the ferro-resonant circuit in cooperation with the output circuit, I am able to produce a voltage rise substantially of the proper value to compensate for the voltage drop produced by any normal value of load current through the resistances of inductance 11, transformer 13, rectifier 14, inductance 15, and the circuit wiring. If required, I can also produce a rising output voltage characteristic or a drooping characteristic, by overcompensating for the resistance or, respectively, by undercompensating. Thus I am able to obtain an output voltage characteristic which is highly desirable for an automatic battery charger. The controlled output voltage automatically maintains the battery at the desired voltage and condition of charge regardless of what load is drawn from the battery, up to the maximum load current available from the rectifier.

My control circuit also protects the rectifiers against overloads by introducing a rapidly increasing voltage drop under overload currents and thereby limiting the maximum load current which can be drawn from the rectifiers.

It will be apparent to those skilled in the art that the control circuit as described is applicable to polyphase as well as single-phase rectification and that the rectifier bridge 14 can be replaced by other rectifying arrangements.

Figure 2 shows an input voltage compensating circuit added to the circuit of Figure 1, and also shows an additional filter section comprising inductance 17 and capacitor 18 added to the direct current output circuit. With the arrangement of Figure 2 I am able to supply a substantially constant voltage to the load for all normal values of load current in spite of wide variations of the voltage of alternating current source 10. The compensation for variation of the voltage of source 10 is accomplished through the cooperation of saturable transformer 21 with capacitor 19 and substantially linear transformer 20. These elements form a voltage regulator as disclosed in U. S. Patent No. 2,221,456, and in cooperation with saturable inductance 11 and 15, capacitor 12, transformer 13, and rectifiers 14, provide a direct current source which, in the preferred embodiment of my invention, supplies a voltage which is substantially independent of the voltage of source 10 over a wide range of voltage from source 10, and for all normal values of load current.

The arrangement shown in Figure 2 is very well adapted for use as an automatic battery charger. The arrangement of Figure 1 used as an automatic battery charger requires a substantially constant alternating supply voltage, while the circuit of Figure 2 representing the preferred embodiment of my invention maintains a substantially constant battery voltage over a wide range of voltage from source 10.

The compensation for voltage drop produced by load current is effected in the circuit of Figure 2 with the cooperation of saturable transformer 21, capacitor 19, and transformer 20, the action of the ferroresonant combination of saturable inductance 11 and capacitor 12 together with inductance 15 and transformer 13 being substantially as described in connection with Figure 1.

Filter inductance 17 and capacitor 18 further reduce the alternating current component of the load voltage below the value supplied by the arrangement of Figure 1. When the presence of a small A. C. ripple in the load voltage is not objectionable inductance 17 and capacitor 18 may be omitted. As explained in connection with Figure 1, when the load is a storage battery, the final filter capacitor, capacitor 18 in this case, may usually be omitted.

Although I have described my invention with a certain degree of particularity, it is understood that the present disclosure has been made only by way of example, and that numerous changes in the details of construction on the combinations and arrangements of parts may be resorted to without departing from the spirit and scope of the invention as hereinafter claimed.

I claim as my invention:

1. A control circuit adapted to be energized by a source of alternating current and to supply regulated direct current to a load, comprising in combination, a rectifier, an alternating-current input circuit connected to said rectifier, and a direct-current output circuit connected to said rectifier, said input circuit comprising a first saturable inductance in series with a first capacitor, said direct-current output circuit comprising a second saturable inductance in series with said load and a second capacitor connected to said second saturable inductance and shunting the alternating current through said second saturable inductance around said load, said input circuit producing with increasing load current a diminishing voltage drop, said second saturable inductance becoming saturated by large values of direct current to said load, causing alternating current to flow in said output circuit, and in turn causing an increase in the voltage supplied to the rectifiers by reflecting an inductive impedance into the input circuit.

2. A rectifier circuit comprising in combination, a rectifier, an input circuit and an output circuit connected to said rectifier, said input circut comprising a series ferroresonant circuit adapted to introduce a diminishing voltage drop with increasing load current, said output circuit including a series-connected saturable inductance adapted to cause alternating current to flow in said output circuit when the flow of direct current through it reduces the impedance of said inductance, the alternating-current in said output circuit being reflected through the rectifier as inductive current and thereby increasing the input voltage to said rectifiers under load.

3. In combination with a rectifier supplied by a circuit having a capacitive reactance for large values of load current, a direct current filter inductance having its reactance controlled by the magnitude of the direct current supplied by the rectifier, said filter inductance passing alternating current when highly magnetized by direct current and reflecting inductive impedance through said rectifier into said circuit having a capacitive reactance.

4. A control circuit comprising in combination, a full-wave rectifier supplied through a series ferroresonant input circuit and a saturable filter choke connected to said rectifier and magnetized by direct current from it, producing when highly magnetized by said direct current an inductive input impedance to said rectifier.

5. A control circuit comprising in combination, an A. C. voltage regulator supplying a full-wave rectifier through a series ferroresonant circuit, and a saturable filter choke connected to said rectifier carrying load current supplied by the rectifier and producing for large values of load current an inductive input impedance to said rectifier.

6. A control circuit comprising in combination, a full-wave rectifier supplied through a series ferroresonant input circuit and a saturable filter choke connected to said rectifier and magnetized by direct current from it, producing when highly magnetized by said direct current an inductive input impedance to said rectifier, thereby increasing the voltage supplied to said rectifier and compensating for the voltage drop produced by the load current.

7. A control circuit comprising in combination, an A. C. voltage regulator supplying a full-wave rectifier through a series ferroresonant circuit, and a saturable filter choke connected to said rectifier carrying load current supplied by the rectifier and producing for large values of load current an inductive input impedance to said rectifier thereby increasing the voltage supplied to said rectifier and compensating for the voltage drop produced by the load current.

8. In combination with a rectifier supplied by a circuit having a capacitive reactance for large values of load currents, a direct current filter inductance having its reactance controlled by the magnitude of the direct current supplied by the rectifier, said filter inductance passing alternating current when highly magnetized by direct current and reflecting inductive impedance through said rectifier into said capacitive circuit thereby increasing the voltage supplied to said rectifier and compensating for the voltage drop produced by the load current.

9. In combination, rectifier means, input circuit means supplying alternating current to said rectifier means, output circuit means supplying a load with direct current from said rectifier means, reactive impedance means rendering said input circuit means capacitive for predetermined values of load current, and inductive means in said output circuit means controlling the input power factor of said rectifier means in accordance with the direct current supplied to said load.

10. A control circuit comprising in combination, a full-wave rectifier supplied through a series ferroresonant input circuit, an inductance substantially in parallel with the input to said full-wave rectifier, and a saturable filter choke connected to said rectifier, and magnetized by direct current from it, said filter choke when highly magnetized by said direct current causing said rectifier to have an inductive input impedance.

11. In combination with a rectifier supplied by an input circuit having a capacitive reactance for large values of load current, a direct-current output circuit including alternating current reactances reflecting reactance through said rectifier into said input circuit, said reactance being determined by the direct current supplied by said rectifier and, in cooperation with said input circuit, controlling the output voltage of the rectifier.

12. A control circuit comprising in combination, an A. C. voltage regulator supplying a full-wave rectifier through a series ferroresonant circuit, and a filter choke connected to said rectifier carrying load current supplied by the rectifier and producing for large values of load current an inductive input impedance to said rectifier thereby increasing the voltage supplied to said rectifier and compensating for the voltage drop produced by the load current.

13. A control circuit comprising in combination, an A. C. voltage regulator supplying a full-wave rectifier through a series ferroresonant circuit, and a filter choke connected to said rectifier carrying load current supplied by the rectifier and producing for large values of load current an inductive input impedance to said rectifier.

GEORGE H. POHM.